(12) United States Patent
Regev et al.

(10) Patent No.: US 10,191,826 B2
(45) Date of Patent: Jan. 29, 2019

(54) METHODS, SYSTEMS, AND COMPUTER READABLE MEDIA FOR PROVIDING AN ANTICIPATED DATA INTEGRITY CHECK

(71) Applicant: Keysight Technologies Singapore (Holdings) Pte. Ltd., Minneapolis, MN (US)

(72) Inventors: Alon Regev, Woodland Hills, CA (US); Noah Steven Gintis, Westlake Village, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 33 days.

(21) Appl. No.: 15/079,016

(22) Filed: Mar. 23, 2016

(65) Prior Publication Data

US 2017/0277612 A1 Sep. 28, 2017

(51) Int. Cl.
G06F 11/00 (2006.01)
G06F 11/263 (2006.01)
G06F 11/273 (2006.01)

(52) U.S. Cl.
CPC ........ G06F 11/263 (2013.01); G06F 11/2733 (2013.01)

(58) Field of Classification Search
CPC ............................ G06F 11/263; G06F 11/2733
See application file for complete search history.

(56) References Cited

U.S. PATENT DOCUMENTS

| | | | |
|---|---|---|---|
| 6,961,429 B1 * | 11/2005 | Hill | H04L 9/3236 380/200 |
| 8,417,478 B2 | 4/2013 | Gintis et al. | |
| 8,571,032 B2 | 10/2013 | Regev | |
| 8,724,498 B2 | 5/2014 | Choi et al. | |
| 8,730,826 B2 | 5/2014 | Regev | |
| 8,745,381 B2 | 6/2014 | Badea | |
| 8,855,070 B2 | 10/2014 | Deng et al. | |
| 8,937,882 B2 | 1/2015 | Devarasetty | |
| 9,071,995 B2 | 6/2015 | Asokan et al. | |
| 9,252,956 B2 * | 2/2016 | Falk | H04L 9/3236 |
| 9,253,062 B2 | 2/2016 | Das et al. | |
| 2002/0142797 A1 * | 10/2002 | Tarighi | G01S 19/35 455/556.1 |
| 2007/0011676 A1 * | 1/2007 | Sahita | G06F 11/263 718/100 |

(Continued)

OTHER PUBLICATIONS

"IxLoad® —Data Test Solution," Ixia Data Sheet, 915-3613-01-5061 Rev A, pp. 1-26 (Publication Date Unknown).

(Continued)

Primary Examiner — Bryce P Bonzo
Assistant Examiner — Jonathan D Gibson
(74) Attorney, Agent, or Firm — Jenkins, Wilson, Taylor & Hunt, P.A.

(57) ABSTRACT

Methods, systems, and computer readable media for providing an anticipated data integrity check are disclosed. According to one method, the method includes generating a test message including an anticipated data integrity check value (ADICV), wherein the ADICV is computed using at least one value based on at least one expected modification to message data in the test message by at least one system under test (SUT), and sending the test message to the at least one SUT.

19 Claims, 5 Drawing Sheets

(56) References Cited

U.S. PATENT DOCUMENTS

2008/0075079 A1\* 3/2008 Smith .................... H04L 47/10
370/392
2015/0365426 A1\* 12/2015 Henocque ................ H04L 9/00
713/176

OTHER PUBLICATIONS

Commonly-assigned, co-pending U.S. Appl. No, 15/364,056 for "Methods, Systems, and Computer Readable Media for Token Based Message Capture," (Unpublished, filed Nov. 29, 2016).

\* cited by examiner

FIG. 1

| FLOW IDs (FLIDs) | VALIDATION RULE IDs | VALIDATION MAPS (E.G., BITS TO CHECK) |
|---|---|---|
| 0-1023 | 0 | 0-256 |
| 1024-2047 | 1 | 0-48, 97-103 |
| 2048-16383 | 0 | 0-256 |
| 16384 | 1 | 0-48, 97-103 |
| 16385-20000 | 2 | 65-72 |

METHODS, SYSTEMS, AND COMPUTER READABLE MEDIA FOR PROVIDING AN ANTICIPATED DATA INTEGRITY CHECK

TECHNICAL FIELD

The subject matter described herein relates to processing information. More specifically, the subject matter relates to methods, systems, and computer readable media for providing an anticipated data integrity check.

BACKGROUND

Various attributes and/or characteristics of a system under test (SUT) may be tested using test platforms and/or related devices. One characteristic that can be tested is data integrity. For example, a data integrity analysis can involve using data integrity check values, such as generated checksums, hash values, or check codes, associated with test messages to validate message content, e.g., when the test messages are received back from a SUT after being processed. However, data integrity analyses may be prone to various issues, including inefficacy related to validating message content that can change while traversing the SUT.

SUMMARY

Methods, systems, and computer readable media for providing an anticipated data integrity check are disclosed. According to one method, the method includes generating a test message including an anticipated data integrity check value (ADICV), wherein the ADICV is computed using at least one value based on at least one expected modification to message data in the test message by at least one system under test (SUT), and sending the test message to the at least one SUT.

According to one system, the system includes a network equipment test device including at least one processor, a memory, and a message generation module (MGM) implemented using the at least one processor and the memory. The MGM is configured to generate a test message including an ADICV, wherein the ADICV is computed using at least one value based on at least one expected modification to message data in the test message by at least one SUT, and to send the test message to the at least one SUT.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including at least one processor and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for providing an anticipated data integrity check. When testing one or more computing or networking resources, it may be desirable to test the resources under non-trivial load conditions that mirror or closely approximate real world scenarios. Test systems may generate test messages that are sent to a system under test (SUT) and returned to the test systems by the SUT. As used herein, a test message or a test message may include or refer to various data units, such as a message, a frame, a datagram, a user datagram protocol (UDP) message, a transport control protocol (TCP) message, or, more generally, a protocol data unit (PDU). Such test systems may include data integrity check values (DICVs) in each test message such that the test systems can validate data content (e.g., message data) in the test message when the test message is returned by the SUT. Some examples of DICVs may include a hash function generated value, a checksum, an error-correcting code, a cyclic redundancy check (CRC), or an error-detecting code.

Various test systems may compute DICVs for message payload information (e.g., information in a message payload). However, such test systems generally fail to compute effective DICVs for message header information since at least some message header information usually changes during a message's trip to a SUT and back. However, while some message header information can change, other message header information may not or should not change during a message's trip to the SUT and back. By being able to identify unexpected or undesired changes to message data, data integrity issues associated with message data, e.g., message header information and/or message payload information, may be detected or identified.

In accordance with some aspects of the subject matter described herein, equipment, techniques, methods, or mechanisms are disclosed for providing an anticipated data integrity check. For example, a computing platform (e.g., a testing platform, a device, or a node) or a module (e.g., a field-programmable gateway array (FPGA), an application-specific integrated circuit (ASIC), or software executing on a processor) may be configured to compute or generate an anticipated DICV (ADICV) for a test message prior to sending the test message to a SUT. In this example, the ADICV may be computed or generated using at least one value based on at least one expected modification to message data (e.g., header information and/or payload information) by at least one SUT.

In accordance with some aspects of the subject matter described herein, equipment, techniques, methods, or mechanisms are disclosed for using an ADICV for validating message data received from a SUT. For example, a computing platform or a module as described herein may receive an ADICV in a message from a SUT. In this example, the ADICV may be computed by the computing platform or the module prior to the message being sent to the SUT and may have been based on expected modifications of message data by the SUT. Continuing this example, the received message data may be analyzed using the ADICV for validation and/or error detection purposes. In some embodiments, a validation map (e.g., a map indicating which bits of the message data to inspect or not inspect) may be used in conjunction with an ADICV for validating particular portions of message data.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
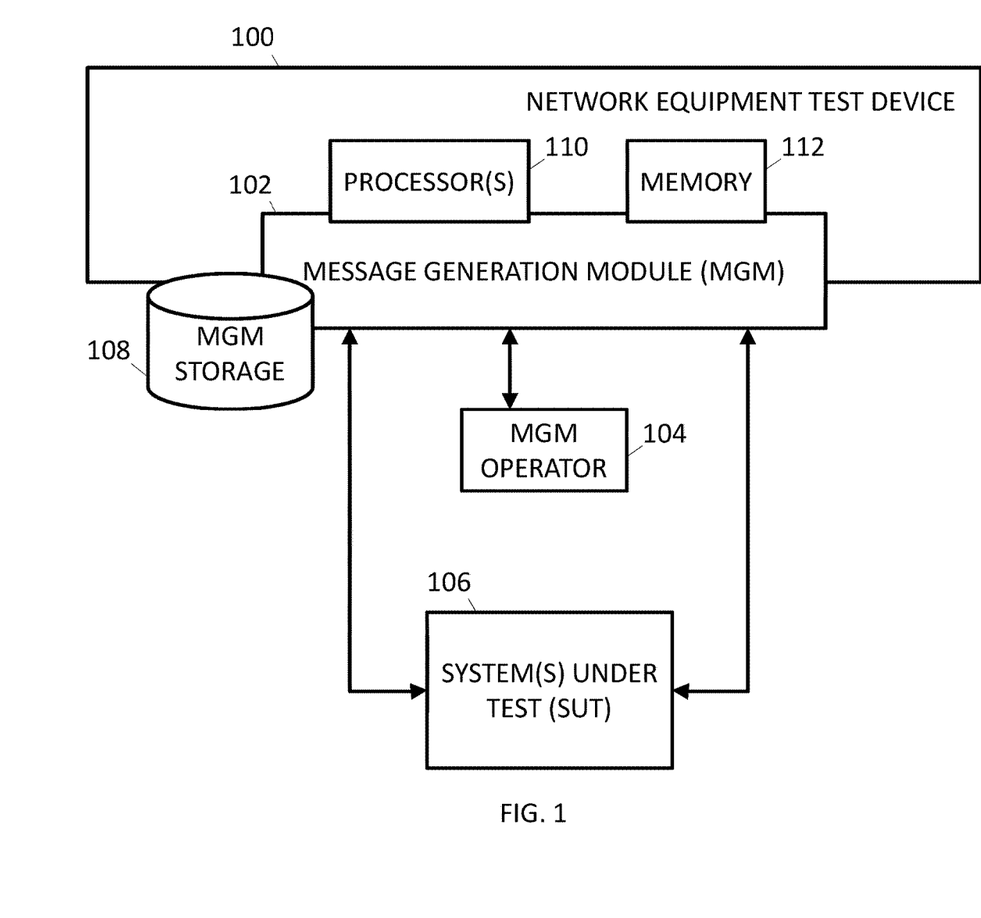
FIG. 1 is a diagram illustrating an exemplary computing platform for providing an anticipated data integrity check values (ADICV) according to an embodiment of the subject matter described herein.

FIG. 1 is a diagram illustrating a network equipment test device 100 for providing an anticipated data integrity check according to an embodiment of the subject matter described herein. Network equipment test device 100 may represent any suitable entity or entities (e.g., one or more testing platforms, nodes, or devices) associated with sending or receiving traffic (e.g., one or more messages or other data units). For example, network equipment test device 100 may generate a substantial amount of traffic for testing one or more system(s) under test (SUT) 106. In this example, network equipment test device 100 may receive traffic from SUT 106 and analyze one or more performance related aspects associated with SUT 106.

In some embodiments, network equipment test device 100 may be a stand-alone tool, a testing device, or software executing on a processor. In some embodiments, network equipment test device 100 may be a single node or may be distributed across multiple devices or nodes.

In some embodiments, network equipment test device 100 may include one or more modules for performing various functions. For example, network equipment test device 100 may include a network node emulation module for emulating a node or device that communicates with SUT 106.

Network equipment test device 100 may include one or more processor(s) 110, a memory 112, and a message generation module (MGM) 102. Processor(s) 110 may represent or include a physical processor, a general purpose microprocessor, a single-core processor, a multi-core processor, a field-programmable gateway array (FPGA), and/or an application-specific integrated circuit (ASIC) for executing software and/or logic stored in memory 112. Memory 112 may represent one or more computer readable media for storing data, logic, or other information.

MGM 102 may be any suitable entity or entities (e.g., software executing on a processor, an ASIC, an FPGA, or a combination of software, an ASIC, or an FPGA) for performing one or more aspects associated with processing (e.g., receiving, generating, sorting, analyzing, and/or sending) messages (e.g., packets, frames, and/or other data units). In some embodiments, MGM 102 may be implemented using processor(s) 110 and/or memory 112. For example, MGM 102 may utilize processor(s) 110 (e.g., using software stored in memory 112) to generate test messages for a number of emulated flows or sessions. In this example, MGM 102 may also utilize processor(s) 110 to perform various tests and/or analyses involving test messages and/or related responses from SUT 106.

In some embodiments, MGM 102 may include functionality for performing data integrity analysis involving DICVs. For example, various messages, such as Ethernet frames and Internet protocol (IP) packets, may include header parameters or fields for DICVs (e.g., a checksum or a CRC). In this example, for a given message, a DICV may be computed based on message data being transmitted in the message and a receiving entity may use the DICV to determine whether the message was received correctly (e.g., that no message data was changed or corrupted during its trip). While a DICV may be useful for validating message data in certain scenarios, DICVs may be less effective when validating message data where at least a portion of the message data is expected to change. For example, MGM 102 may generate test messages expecting at least some message header information to be changed by SUT 106 during processing before the test messages are sent back from SUT 106. In this example, if DICVs in test messages generated at the time the messages are transmitted are used to analyze data integrity after the test messages have been processed, the DICVs will indicate data integrity issues even if the changes are expected because the DICVs are computed based on message data prior to the changes.

In some embodiments, MGM 102 may include functionality for generating and/or computing ADICVs for one or more test messages. In contrast to DICVs being based on actual data in the transmitted message, ADICVs may be computed based on message data (e.g., header field values) that is expected to be in a message after SUT 106 has modified the message. For example, MGM 102 may generate a test message with particular payload and header data. In this example, MGM 102 may expect SUT 106 to modify an IP time to live (TTL) field value by decreasing the TTL field value by 1. Continuing with this example, if the generated test message includes a TTL field value equal to 4, MGM 102 may use a TTL field value of 3 when computing an ADICV for the test message.

In some embodiments, MGM 102 may generate and include ADICVs and DICVs in one or more test messages. For example, MGM 102 may generate and include a DICV in a message based on message data (e.g., a TTL field value of 4) in the message prior to transmission to SUT 106 and may generate and include a separate or distinct ADICV in the message based on expected message data (e.g., a TTL field value of 3) when the message is received from SUT 106, e.g., after the message has been processed by SUT 106. In this example, the DICV may be usable by SUT 106 for validating message data when SUT 106 receives the message from MGM 102 or network equipment test device 100 and, similarly the ADICV may be usable by MGM 102 or a related entity for validating the message data when MGM 102 or network equipment test device 100 receives the message from SUT 106.

In some embodiments, MGM 102 may include one or more communications interfaces, e.g., one or more network interface cards (NICs), for interacting with users, modules, and/or nodes. For example, MGM 102 may use one or more communications interfaces for receiving and sending various types of data units; such as IP messages, Ethernet frames, Ethernet messages, PDUs, datagrams, UDP messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, MGM 102 may include or provide a communications interface for communicating with MGM operator 104. MGM operator 104 may be any entity (e.g., an automated system or a device or system controlled or controllable by a human user) for selecting and/or configuring various aspects associated with storing message related data and/or generating message related metrics. For example, various user interfaces (e.g., an application user interface (API) and a graphical user interface (GUI)) may be provided for providing configuration information, such as a time out period for assuming message loss, types of metrics to be generated, frequency of metric generation, a number of messages per flow to be generated, a number of messages per port tuple to be generated, and/or a number of flows to emulate in a test scenario.

In some embodiments, various user interfaces may be usable for providing and/or modifying expected modifications for various message data or field values in one or more test scenarios. For example, MGM operator 104 may configure MGM 102 with certain expectation rules for SUT 106. In this example, expectation rules may indicate how or when SUT 106 may modify one or more parameters or field values in various types of messages. In another example, may configure MGM 102 with expected values after processing by SUT 106 based on known or predetermined starting values. In some embodiments, various user interfaces may also be usable for providing or modifying validation maps and/or validation rules for indicating which bits or message portions to inspect when performing data integrity analyses.

In some embodiments, one or more user interfaces for testing SUT 106 and/or for providing configuration information may support automation (e.g., via one or more scripting languages), a representation state transfer (REST) API, a command line, and/or a web based GUI. For example, MGM operator 104 may use a web browser to interact with a web based GUI associated with programming or configuring one or more aspects for testing SUT 106.

In some embodiments, MGM 102 may include one or more communications interfaces for interacting with SUT 106. For example, MGM 102 or another entity may be configured to send or receive test messages to or from one or more ports (e.g., ports 1, 2, and/or 3) associated with SUT 106. SUT 106 may be any suitable entity or entities (e.g., devices, systems, or platforms) for communicating with network equipment test device 100 and/or receiving, processing, forwarding and/or sending one or more test messages. For example, SUT 106 may include a network router, a network switch, a network device, a server, or a network controller. In another example, SUT 106 may include one or more systems and/or computing platforms, e.g., a data center or a group of servers and/or routers. In yet another example, SUT 106 may include one or more networks or related components, e.g., an access network, a core network, or the Internet.

In some embodiments, MGM 102 may include functionality for waiting for responses (e.g., packets, frames, and/or other messages) from SUT 106. For example, after sending a test message and storing information about the test message, MGM 102 or another entity may be configured to wait for the test message or related information to be received from SUT 106. In this example, MGM 102 or another entity may use a timer or another technique for determining how long to wait before assuming that the test message was lost or misrouted. If an error message is received and/or after a certain amount of time has elapsed, MGM 102 or another entity may perform one or more actions, such as generating a message related metric, logging an event, notifying a user, and/or updating a relevant data structure entry.

In some embodiments, MGM 102 may include functionality for analyzing responses received from SUT 106. For example, MGM 102 may be configured to receive a test message from SUT 106 and may determine whether the test message is expected, unexpected, corrupted, and/or out of order. In another example, MGM 102 may be configured to receive an error message from SUT 106 and may determine which, if any, test message, flow, and/or port tuple is associated with the error message.

In some embodiments, MGM 102 may include functionality for using ADICVs when validating or verifying message data (e.g., packet header information and/or packet payload information). For example, MGM 102 may be configured to receive a message from SUT 106 containing an ADICV. In this example, the ADICV may have been generated by MGM 102 prior to the message being sent to SUT 106 for processing and may be based on expected modifications (e.g., as indicated by a test operator and/or determined by MGM 102) to message data by SUT 106. Continuing with this example, MGM 102 or a related entity may use the ADICV to validate message data in the received message, e.g., after the message has been processed by SUT 106.

In some embodiment, MGM 102 may generate a reception DICV based on message data in a received message. For example, a reception DICV may be computed using values in a message received by MGM 102 after being processed by SUT 106. In some embodiments, MGM 102 may determine whether the reception DICV matches an ADICV in the received message. If a match is determined, MGM 102 may indicate that no data integrity issues are detected. If a match is not determined (e.g., a reception DICV is different from an ADICV in the message), MGM 102 may indicate that one or more data integrity issues are detected.

In some embodiments, MGM 102 may use validation rules and/or validation maps for indicating which bits or message portions to inspect when performing data integrity analyses. For example, a reception DICV may be computed using particular portions (e.g., field values) of a message received by MGM 102 after being processed by SUT 106. In this example, a validation rule or validation map may indicate which portions of the message to use when generating the reception DICV. In some embodiments, validation rules or validation maps may use a bit and/or byte numbering scheme for indicating which portions are to be used.

In some embodiments, MGM 102 may include functionality for accessing MGM storage 108 or memory 112. MGM storage 108 may be any suitable entity or entities (e.g., a storage device, memory 112, a non-transitory computer readable medium, or a storage system) for maintaining or storing information related to messages and/or related metrics. For example, MGM storage 108 may contain information usable for generating metrics (e.g., statistics) associated with one or more performance aspects of SUT 106. Exemplary message related data may include a packet group or flow identifiers (FLIDs), payload information, header information, and/or other related information, such as validations rules and/or validation maps. In this example, MGM storage 108 may also contain metrics associated with one or more performance aspects of SUT 106 during one or more test scenarios. For example, using configuration information for different tests or test sessions, MGM storage 108 may maintain a particular set of computed metrics for a first test and may maintain another set of computed metrics for a second test. In some embodiments, MGM storage 108 and/or memory 112 may be located at network equipment test device 100, another node, or distributed across multiple platforms or devices.

It will be appreciated that FIG. 1 is for illustrative purposes and that various nodes and/or modules, locations, and/or functionality described above in relation to FIG. 1 may be changed, altered, added, or removed.

Figure 2:
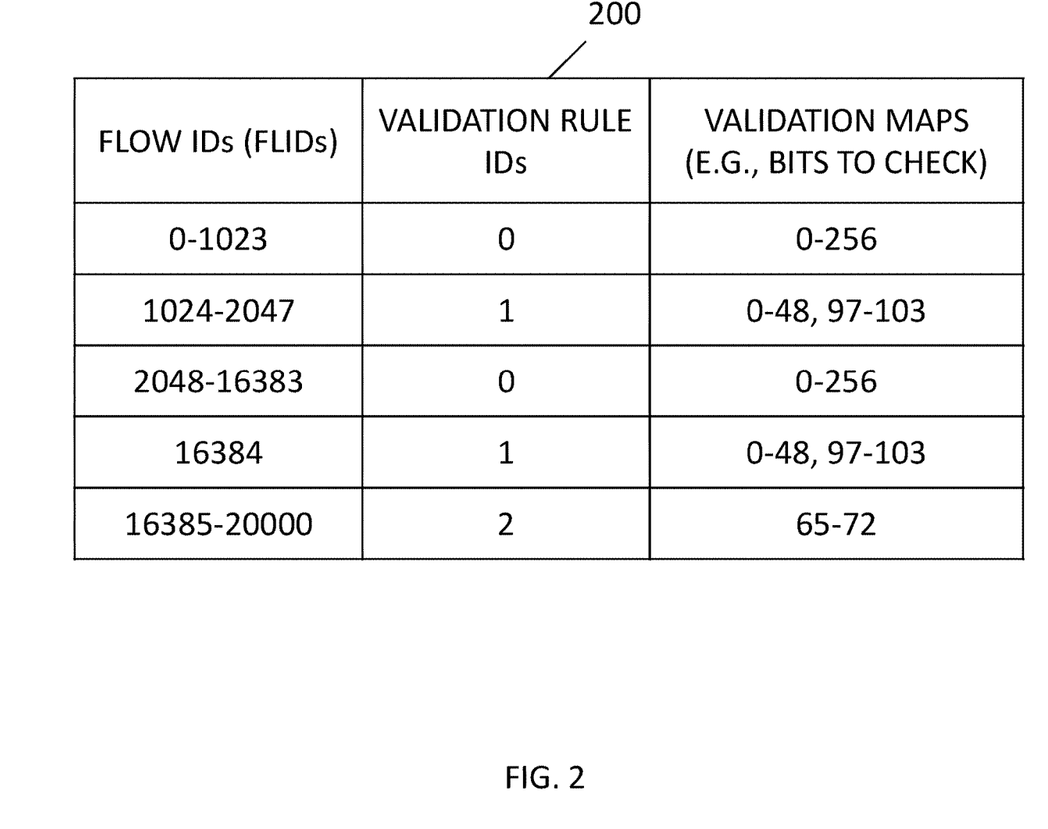
FIG. 2 is a diagram illustrating exemplary data associated with a data integrity analysis according to an embodiment of the subject matter described herein.

FIG. 2 is a diagram illustrating exemplary data 200 associated with data integrity analysis according to an embodiment of the subject matter described herein. In some embodiments, data 200 may be accessed and/or stored by network equipment test device 100 and/or MGM 102 using various data structures. In some embodiments, data 200 may include any suitable information, such as FLIDs, validation rules, and/or validation maps, usable for performing data integrity analysis. In some embodiments, data 200 may be stored or maintained in MGM storage 108 and/or memory 112 and may be usable for generating DICVs or ADICVs and/or other functions.

Referring to FIG. 2, data 200 may be depicted using a table representing associations between FLIDs, validation rules, and/or validation maps. For example, a table representing data 200 may comprise columns and/or fields for FLIDs, validation rules, and/or validation maps, e.g., information indicating which bits of a message or a message header portion to inspect when performing a data integrity analysis.

An FLID field value may comprise a value, a name, and/or a related identifier for indicating a particular session or message flow (e.g., one or more related packets). For example, an FLID may include any suitable identifier, such as a session identifier or a subset of message header information, usable for identifying one or more related messages or message groups. For example, an FLID may include a 5-tuple including (1) source address(es), (2) destination address(es), (3) source port number(s), (4) destination port number(s), and (5) application protocol(s). In another example, such as depicted in FIG. 2, an FLID may include a single value, such as a session identifier, or may represent a range or group of values, e.g., all sessions having session identifiers between 0-1023.

In some embodiments, FLIDs may be used as keys or index values into a data structure for storing data 200. For example, when MGM 102 receives a message from SUT 106, MGM 102 may use an FLID stored in the message to retrieve a validation rule and/or a validation map associated with the message. In this example, MGM 102 may use the validation rule and/or validation map when performing one or more data integrity analyses associated with the message.

A validation rule identifier field value may comprise a value, a name, and/or a related identifier for indicating one or more rules or validation maps usable for validating messages or data therein. For example, a validation rule identifier field value may indicate a data structure containing one or more validation rules. In another example, a validation rule identifier field value may indicate a particular validation map to use when performing a data integrity analysis.

A validation map field value may comprise a value, a name, expressions, code, logic, text, and/or a related identifier for indicating one or more portions of a message to use when generating or computing DICVs or ADICVs. In some embodiments, a validation map field value use a bit and/or byte numbering scheme for indicating that a particular portion of a message header is to be used or not used when analyzing data integrity of a message. In such embodiments, each validation map or related encoding scheme may be dependent on a particular message format, a data type, or test session. For example, some validation maps may indicate locations in a header having 256 bits or more, while other validation maps may indicate locations in a header having less than 256 bits.

It will be appreciated that data 200 in FIG. 2 is for illustrative purposes and that different and/or additional information may also be stored or maintained. For example, MGM storage 108 and/or memory 112 may store associated FLIDs and validation maps without storing validation rule identifiers. Further, it will be appreciated that data 200 may be stored in various data structures, memories, media, and/or in one or more locations. For example, MGM 102 may maintain an ingress data structure for storing information about messages being received from SUT 106 and an egress data structure for storing information about messages being sent to SUT 106.

Figure 3:
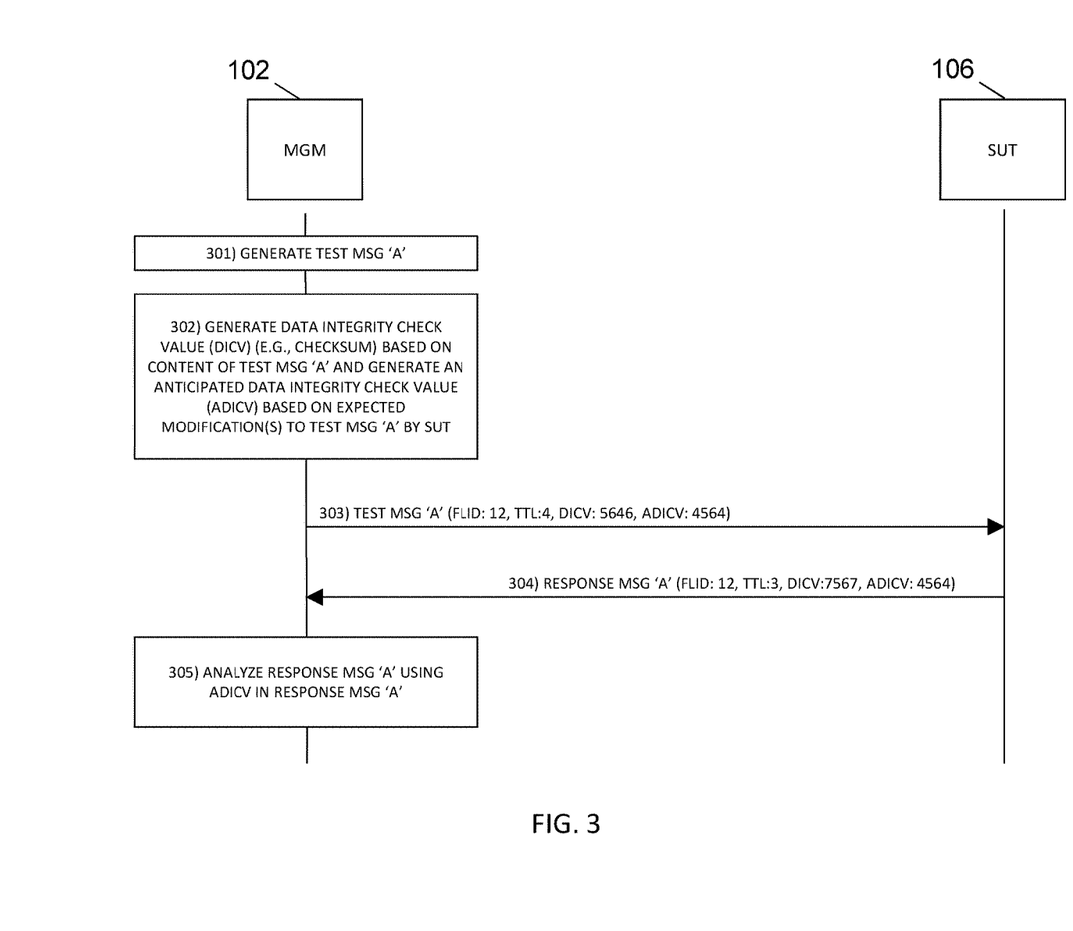
FIG. 3 is a diagram illustrating using an ADICV when performing a data integrity analysis according to an embodiment of the subject matter described herein.

FIG. 3 is a diagram illustrating using an ADICV when performing a data integrity analysis according to an embodiment of the subject matter described herein. In some embodiments, MGM 102 may generate a test message comprises various header field values. Prior to sending the test message to SUT 106, MGM 102 may generate and compute an ADICV based on expected modifications to message data by SUT 106. After receiving and processing the test message, SUT 106 may return the modified test message to MGM 102 and MGM 102 may use the ADICV to determine whether SUT 106 modified the test message in unexpected ways, which may be indicative of one or more data integrity issues associated with SUT 106.

Referring to FIG. 3, at step 301, a test message 'A' may be generated by MGM 102. For example, an IP packet may be generated by MGM 102 and may include particular header parameter or field values, such as a FLID, a TTL value, a source address value, a destination address value, and port information.

At step 302, a DICV may be generated based on content (e.g., message header information and/or message payload information of test message 'A' and an ADICV may be generated based on expected modifications to test message 'A' by SUT 106. For example, assuming a test message includes an IP TTL value of 4, a DICV for the test message may be computed using the IP TTL value of 4. In this example, assuming MGM 102 expects SUT 106 to decrement the IP TTL value by 1 to 3 before sending the test message back to MGM 102, an ADICV may be generated using the IP TTL value of 3. As such, in this example, the DICV and the ADICV for the test message will be different since the IP TTL values used in generating or computing the check values are different.

At step 303, the test message 'A' may be sent from MGM 102 to SUT 106. For example, the test message may include a FLID (e.g., a packet group identifier or a session identifier), a TTL value, a DICV, and an ADICV.

In some embodiments, after receiving a test message, SUT 106 may perform one or more processing actions. In such embodiments, a processing action may include modifying message data in the test message, such as modifying an IP TTL value in a message header or changing other header information and/or payload information.

In some embodiments, after modifying a test message, SUT 106 may compute a new DICV and replace the original DICV with the new DICV, e.g., prior to sending the test message back to MGM 102. For example, assuming a first DICV is stored in an IP checksum field for a test message, SUT 106 may be configured to replace the first DICV with a second DICV prior to sending the test message onwards to a destination. In this example, SUT 106 may be unaware of an ADICV (e.g., the ADICV may be stored in a separate header field or may be in a payload portion that is not modified or used by SUT 106) or may be configured to not modify the ADICV.

At step 304, a response message 'A' may be sent from SUT 106 to MGM 102. For example, a response message 'A' may represent a test message 'A' after processing by SUT 106. In this example, the response message may include a same FLID and an ADICV as the test message 'A', but may include a different TTL value and DICV than the test message 'A'.

At step 305, the response message 'A' may be received and analyzed using the ADICV in the response message 'A'. For example, MGM 102 may compute a reception DICV based on message data in response message 'A' and may compare the reception DICV to an ADICV in the response message 'A'. In this example, if the two check values do not match, MGM 102 may determine that data integrity issues are detected.

It will be appreciated that FIG. 3 is for illustrative purposes and that different and/or additional messages and/or actions may be used. It will also be appreciated that various messages and/or actions described herein may occur in a different order or sequence.

Figure 4:
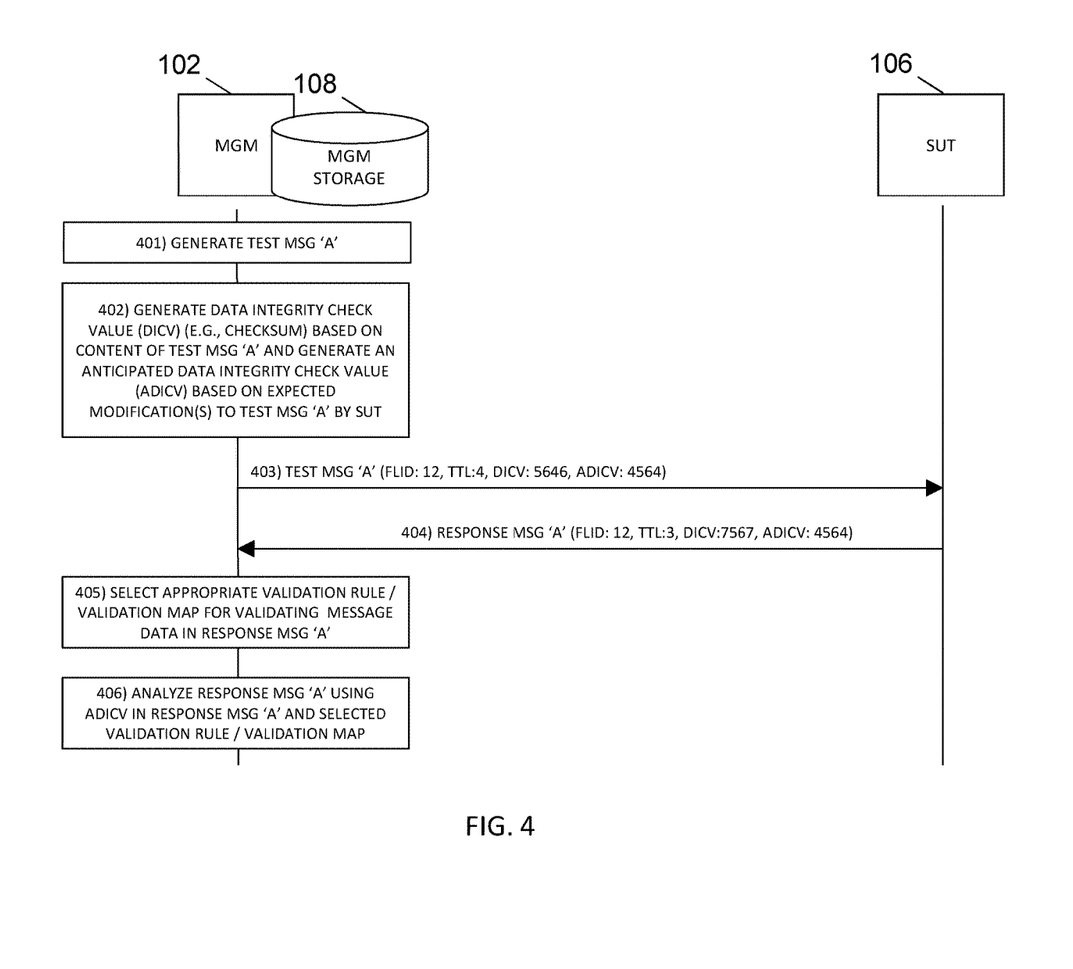
FIG. 4 is a diagram illustrating using an ADICV and one or more validation rules when performing a data integrity analysis according to an embodiment of the subject matter described herein.

FIG. 4 is a diagram illustrating using an ADICV and one or more validation rules when performing a data integrity analysis according to an embodiment of the subject matter described herein. In some embodiments, MGM 102 may use validation rules and/or validation maps for indicating which message data to inspect or validate (e.g., which values to use when computing DICVs or ADICVs). In such embodiments, MGM 102 may associate the validation rules and/or validation maps with one or more message identifiers and may use the message identifiers in received messages to select validation rules and/or validation maps that are appropriate when performing data integrity analyses on the received messages.

Referring to FIG. 4, at step 401, a test message 'A' may be generated by MGM 102. For example, an IP packet may be generated by MGM 102 and may include particular header parameter or field values, such as a FLID, a TTL value, a source address value, a destination address value, and port information.

At step 402, a DICV may be generated based on content (e.g., message header information and/or message payload information of test message 'A' and an ADICV may be generated based on expected modifications to test message 'A' by SUT 106.

In some embodiments, a DICV and an ADICV generated by MGM 102 may be based on one or more predetermined validation rules or validation maps stored in MGM storage 108. For example, MGM 102 may select a validation rule and/or validation map based on a test message's FLID. In this example, the validation rule and/or validation map may indicate that the first 256 bytes of a message header is to be used for computing a DICV and an ADICV.

At step 403, the test message 'A' may be sent from MGM 102 to SUT 106. For example, the test message may include a FLID, a TTL value, a DICV, and an ADICV.

In some embodiments, after receiving a test message, SUT 106 may perform one or more processing actions. In such embodiments, a processing action may include modifying message data in the test message, such as modifying an IP TTL value in a message header or changing other header information and/or payload information.

In some embodiments, after modifying a test message, SUT 106 may compute a new DICV and replace the original DICV with the new DICV, e.g., prior to sending the test message back to MGM 102.

At step 404, a response message 'A' may be sent from SUT 106 to MGM 102. For example, a response message 'A' may represent a test message 'A' after processing by SUT 106. In this example, the response message may include a same FLID and an ADICV as the test message 'A', but may include a different TTL value and DICV than the test message 'A'.

At step 405, a validation rule and/or validation map may be selected for validating message data in the response message 'A'. For example, MGM 102 may use a FLID value in the response message 'A' to select a validation rule and/or validation map stored in MGM storage 108.

At step 406, the response message 'A' may be received and analyzed using the ADICV in the response message 'A' and the selected validation rule and/or validation map. For example, MGM 102 may compute a reception DICV based on particular portions of the message data in response message 'A', where the particular portions are indicated by an associated validation rule and/or validation map. In this example, MGM 102 may compare the reception DICV to an ADICV in the response message 'A' and, if the two check values do not match, MGM 102 may determine that data integrity issues are detected.

It will be appreciated that FIG. 4 is for illustrative purposes and that different and/or additional messages and/or actions may be used. It will also be appreciated that various messages and/or actions described herein may occur in a different order or sequence.

Figure 5:
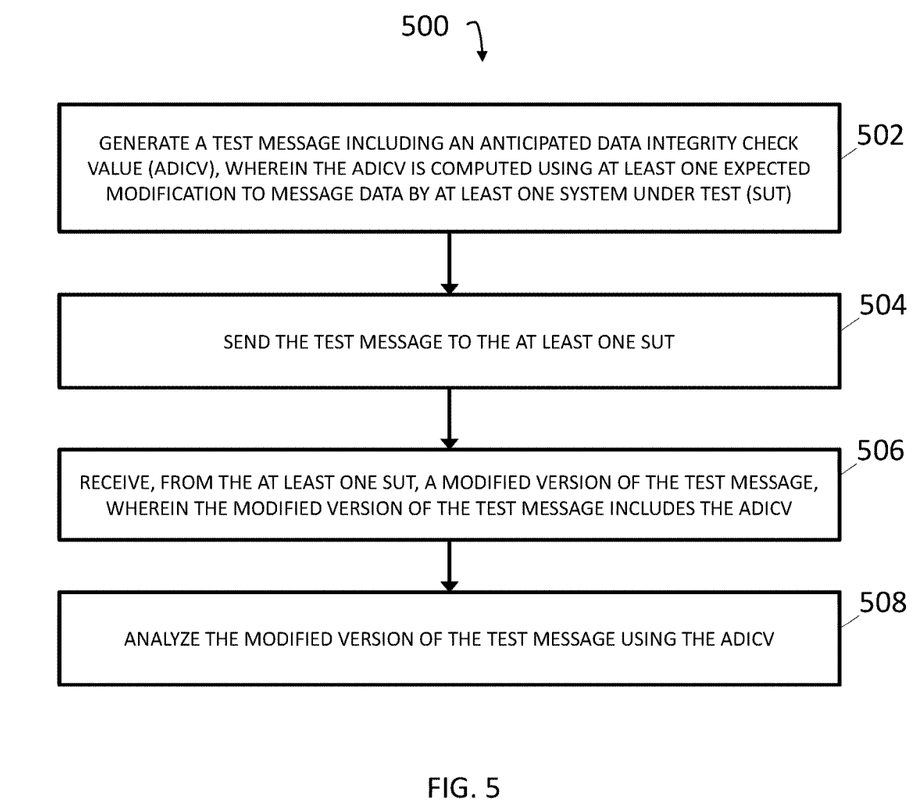
FIG. 5 is a diagram illustrating an exemplary process for providing an anticipated data integrity check according to an embodiment of the subject matter described herein.

FIG. 5 is a diagram illustrating an exemplary process for providing an anticipated data integrity check according to an embodiment of the subject matter described herein. In some embodiments, exemplary process 500, or portions thereof, may be performed by or at network equipment test device 100, MGM 102, and/or another node or module. For example, network equipment test device 100 may include at least one computing platform and/or testing platform for testing one or more performance aspects associated with SUT 106.

At step 502, a test message may be generated. The test message may include an ADICV, wherein the ADICV is computed using at least one value based on at least one expected modification to message data in the test message by at least one SUT 106. For example, MGM 102 may generate an ADICV using expected changes of header field values in a test message after being processed by SUT 106.

In step 504, the test message may be sent to the at least one SUT 106. For example, MGM 102 may send a test message containing an ADICV to SUT 106 for processing.

In some embodiments, e.g., after a test message is processed by at least one SUT 106, a modified version of the test message may be received from the at least one SUT 106 and may include an ADICV. In such embodiments, the modified version of the test message may be analyzed using the ADICV.

In some embodiments, an ADICV may be located in a message header field different from an Ethernet CRC field or IP checksum field.

In some embodiments, an ADICV may be located in a payload portion of the message.

In some embodiments, analyzing a modified version of a test message may include determining whether the at least expected modification indicated by the ADICV occurred.

In some embodiments, analyzing a modified version of a test message may include computing a reception DICV using a portion of message data in the modified version of the test message.

In some embodiments, analyzing a modified version of a test message may include determining whether a reception DICV and an ADICV match.

In some embodiments, a portion of the message data used in computing a reception DICV may be determined using a validation map associated with a test message.

In some embodiments, a validation map may be stored in a data store or located in the test message.

In some embodiments, SUT 106 may include a network switch, a network router, or a network device.

It should be noted that network equipment test device 100, MGM 102, and/or functionality described herein may constitute a special purpose computing device. Further, network equipment test device 100, MGM 102, and/or functionality described herein can improve the technological field of data integrity testing and/or related test platforms. For example, by generating and using an ADICV to validate message data, data integrity issues associated with SUT 106, including where SUT 106 unexpectedly modifies message header information, can be detected and/or identified. Further, by using a validation rule and/or a validation map for identifying portions of message data for inspection, data integrity analyses can be more efficient and/or granular than approaches that involve checking entire messages or message headers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing an anticipated data integrity check, the method comprising:
generating a test message including an anticipated data integrity check value (ADICV), wherein the ADICV is computed using at least one expected value based on at least one expected modification to at least one actual value in the test message by at least one system under test (SUT), wherein the ADICV is computed and inserted in the test message prior to the test message being sent to the at least one SUT for modification;
sending the test message to the at least one SUT;
receiving, from the at least one SUT, a modified version of the test message, wherein the modified version of the test message includes the ADICV; and
determining whether the at least one SUT operates as expected by analyzing the modified version of the test message using the ADICV.

2. The method of claim 1 wherein the ADICV is located in a message header field different from an Ethernet cyclic redundancy check (CRC) field or Internet protocol (IP) checksum field.

3. The method of claim 1 wherein the ADICV is located in a payload portion of the test message.

4. The method of claim 1 wherein analyzing the modified version of the test message includes determining whether the at least one expected modification indicated by the ADICV occurred.

5. The method of claim 1 wherein analyzing the modified version of the test message includes computing a reception data integrity check value (DICV) using a portion of message data in the modified version of the test message.

6. The method of claim 5 wherein analyzing the modified version of the test message includes determining whether the reception DICV matches the ADICV.

7. The method of claim 5 wherein the portion of the message data used in computing the reception DICV is determined using a validation map associated with the test message.

8. The method of claim 7 wherein the validation map is stored in a data store or located in the test message.

9. The method of claim 1 wherein the SUT includes a network switch, a network router, or a network device.

10. A system for providing an anticipated data integrity check, the system comprising:
a network equipment test device including:
a memory;
at least one processor; and
a message generation module (MGM) implemented using the at least one processor and the memory, wherein the MGM is configured to generate a test message including an anticipated data integrity check value (ADICV), wherein the ADICV is computed using at least one expected value based on at least one expected modification to at least one actual value in the test message by at least one system under test (SUT), wherein the ADICV is computed and inserted in the test message prior to the test message being sent to the at least one SUT for modification; to send the test message to the at least one SUT; to receive, from the at least one SUT, a modified version of the test message, wherein the modified version of the test message includes the ADICV; and to determine whether the at least one SUT operates as expected by analyzing the modified version of the test message using the ADICV.

11. The system of claim 10 wherein the ADICV is located in a message header field different from an Ethernet cyclic redundancy check (CRC) field or Internet protocol (IP) checksum field.

12. The system of claim 10 wherein the ADICV is located in a payload portion of the test message.

13. The system of claim 10 wherein the MGM is configured to determine whether the at least one expected modification indicated by the ADICV occurred.

14. The system of claim 10 wherein the MGM is configured to compute a reception data integrity check value (DICV) using a portion of message data in the modified version of the test message.

15. The system of claim 14 wherein the system is configured to determine whether the reception DICV matches the ADICV.

16. The system of claim 14 wherein the MGM is configured to determine the portion of the message data used in computing the reception DICV using a validation map associated with the test message.

17. The system of claim 16 wherein the validation map is stored in a data store or located in the test message.

18. The system of claim 10 wherein the SUT includes a network switch, a network router, or a network device.

19. A non-transitory computer readable medium comprising computer executable instructions embodied in the non-transitory computer readable medium that when executed by at least one processor of a computer perform steps comprising:

generating a test message including an anticipated data integrity check value (ADICV), wherein the ADICV is computed using at least one expected value based on at least one expected modification to at least one actual value in the test message by at least one system under test (SUT), wherein the ADICV is computed and inserted in the test message prior to the test message being sent to the at least one SUT for modification;

sending the test message to the at least one SUT;

receiving, from the at least one SUT, a modified version of the test message, wherein the modified version of the test message includes the ADICV; and determining whether the at least one SUT operates as expected by analyzing the modified version of the test message using the ADICV.

\* \* \* \* \*